(12) United States Patent
Olsson et al.

(10) Patent No.: US 10,748,011 B2
(45) Date of Patent: Aug. 18, 2020

(54) METHOD, DEVICE AND SYSTEM FOR DETECTING A LOITERING EVENT

(71) Applicant: Axis AB, Lund (SE)

(72) Inventors: Tom Olsson, Lund (SE); Mattias Backman, Lund (SE); Daniel Molin, Lund (SE); Jacob Gumpert, Lund (SE); Marianne Falk, Lund (SE); Niklas Rosell, Lund (SE)

(73) Assignee: Axis AB, Lund (SE)

( * ) Notice: Subject to any disclaimer, the term of this patent is extended or adjusted under 35 U.S.C. 154(b) by 102 days.

(21) Appl. No.: 16/211,271

(22) Filed: Dec. 6, 2018

(65) Prior Publication Data

US 2019/0188487 A1    Jun. 20, 2019

(30) Foreign Application Priority Data

Dec. 19, 2017  (EP) .................................... 17208476

(51) Int. Cl.
  *G06K 9/00* (2006.01)
(52) U.S. Cl.
  CPC ..... *G06K 9/00778* (2013.01); *G06K 9/00771* (2013.01); *G06K 2009/00738* (2013.01); *G06K 2209/27* (2013.01)
(58) Field of Classification Search
  CPC .............. G06F 15/173; G06F 9/00778; G06K 9/00771
  See application file for complete search history.

(56) References Cited

U.S. PATENT DOCUMENTS

| 2013/0166711 | A1  | 6/2013 | Wang et al. |
| 2014/0161316 | A1* | 6/2014 | Golan ................ G06K 9/00261 382/103 |
| 2016/0155003 | A1  | 6/2016 | Venetianer et al. |

FOREIGN PATENT DOCUMENTS

| WO | 2012/074352 A1 | 6/2012 |
| WO | 2012/074366 A2 | 6/2012 |
| WO | 2012/074366 A3 | 6/2012 |
| WO | 2012/074370 A1 | 6/2012 |
| WO | 2013/135969 A1 | 9/2013 |

OTHER PUBLICATIONS

Nam, Y., "Loitering detection using an associating pedestrian tracker in crowded scenes," Multimedia Tools and Application, vol. 74, Issue 9, pp. 2939-2961 (May 2015) (Abstract).

* cited by examiner

*Primary Examiner* — King Y Poon
*Assistant Examiner* — Michael Burleson
(74) *Attorney, Agent, or Firm* — Xsensus LLP (57) ABSTRACT

The present invention relates to monitoring applications. In particular, the present invention relates to a method, device and system for detecting a loitering event in which the loitering time of objects with different object IDs, which subsequent to each other spends time within an area of interest within a monitored scene, will be combined.

15 Claims, 6 Drawing Sheets

METHOD, DEVICE AND SYSTEM FOR DETECTING A LOITERING EVENT

CROSS-REFERENCE TO RELATED APPLICATION

This application is based upon and claims the benefit of priority from European Patent Application No. 17208476.6, filed on Dec. 19, 2017, the entire contents of which are incorporated herein by reference.

TECHNICAL FIELD

The present invention relates to monitoring applications. In particular, the present invention relates to a method, device and system for detecting a loitering event.

BACKGROUND

Escalating security concerns has led to increased installations of monitoring means such as surveillance cameras in rooms, buildings, airports, cities and etc. for monitoring purposes. However, it is labour intensive to monitor all the live events or captured videos. Although it is well recognized that monitoring these events manually would be most effective and accurate, this requires attention at all times from security personnel. The problem of keeping the attention for long periods is well known. Thus, automating the analysis of the captured monitoring material would allow the security personnel to carry out the surveillance task more effectively.

One of the demanding monitoring tasks is to detect loitering events. Detection of a loitering event is highly crucial as the loitering behaviour often is related to harmful activities such as drug-dealing activity, scene investigation for robbery and also unhealthy social problem of teenagers wasting their time in the public area.

Systems and methods for detecting loitering events typically require tracking of the object of interest to carry out the loitering detection. The accuracy of the detection of loitering events is highly dependent on the performance of the tracking methodology.

There is thus a need for improvements within this context.

SUMMARY OF THE INVENTION

In view of the above, it is thus an object of the present invention to overcome or at least mitigate the problems discussed above. In particular, it is an object to provide methods, devices and systems which improve the detection of loitering events for a variety of loitering behaviours and situations.

According to a first aspect of the invention, there is provided a method for detecting a loitering event within an area of interest, AOI, the method comprising the steps of:
receiving first object data corresponding to a detected first object within a monitored scene, the first object data comprising a first ID, a first position data, and a first timestamp;
determining that the first position data overlaps with the AOI;
receiving second object data corresponding to the detected first object within a monitored scene, the second object data comprising the first ID, a second position data, and a second timestamp;
determining that the second position data overlaps with the AOI;
adding a time difference between the second and first time stamp to an aggregate period of time;
receiving third object data corresponding to a detected second object within the monitored scene, the third object data comprising a second ID different from the first ID, a third position data and a third timestamp, the third time stamp being later than the second time stamp;
determining that the third position data overlaps with the AOI;
receiving fourth object data corresponding to the detected second object within the monitored scene, the fourth object data comprising the second ID, a fourth position data and a fourth timestamp;
determining that the fourth position data overlaps with the AOI;
adding a time difference between the fourth and third time stamp to the aggregate period of time;
detecting a loitering event when the aggregated period of time exceeds a first threshold period of time.

By "ID" is generally meant any type of indication that can be used to differentiate the associated object in relation with other objects. For example, if the object data comprises size data, such data may be used for differentiating objects associated with a plurality of received object data. Another purpose of the ID is that an object can be tracked in time, i.e. such that a plurality of object data with different time stamps can be connected in time. The ID can be represented by an integer e.g. a serial number such as 1, 2, 3 etc. The ID can be represented by a text such as a name of the object. The ID may also be called "identification", "tag", "label", "name", "differentiating feature", etc. In other words, the ID can be any type of data that can be used for differentiating an object in relation to other objects.

By "area of interest" (AOI) is generally meant a definition of an area within the monitored scene in which an object may be defined as a loitering object. In some embodiments, the AOI is the whole monitored scene. In another embodiment, the AOI is defined by coordinates. In this embodiment, the coordinates of the AOI may depend on the coordinates of the position data of the received object data. For example, the area of interest may be an area defined in X, Y and/or Z coordinates, in case the position data of the received object data is defined in such coordinates. The AOI may be defined by the coordinate system of the device capturing the monitored scene (e.g. a camera, RADAR device etc.), i.e. global coordinates. The AOI may also be defined in coordinates relative to the monitored scene (e.g. position in the image plane in video captured by a video capturing device), such as x=0.3-0.7, y=0.3-0-7 (i.e. defined by the coordinates (0,3;0,3), (0,3;0,7), (0,7;0,7), (0,7;0,3)), in a view of a scene covering the range −1 to 1 in the x- as well as y-coordinates. In the embodiment of using RADAR data, the AOI may be defined using an angular range and optionally a depth range.

By "position data" is generally meant any type of data which may be used for determining a position for the object within the monitored scene. The position data may for example be one point in space. In other embodiments, the position data is defined by coordinates of vertices of a bounding box for the object within the space, or a more complex polygon structure for the object. The position data may be defined in a global coordinate system (e.g. an actual physical position of an object as defined by data from a RADAR device) or a relative coordinate system (e.g. position in the image plane in video captured by a video capturing device), as described above. In the embodiment of using RADAR data, the position data may comprise an indication of an angle and a depth for the detected object in the scene.

As used herein, "determining that position data overlaps with the AOI" (or excluded area as defined below) is generally meant that a defined part of the object is within the AOI. In the embodiment where the AOI is the whole monitored scene, this step is implicitly performed in that the object data is received. In the embodiment where the AOI is only a part of the monitored scene, the position data is compared to the coordinates of the AOI. In the embodiment where the position data is a point, the definition is that the point should be within the AOI, but for more complex position data such as a bounding box, other rules may be applied. In one embodiment, it is enough that a single point within the bounding box/polygon is within the AOI to be defined as overlapping. In another embodiment, the entire bounding box/polygon may need to be within the AOI to be defined as overlapping. In yet another embodiment, ⅓ of the bounding box/polygon area should be within the AOI to be defined as overlapping. In yet another embodiment, a pre-defined point within the bounding box of the object (such as ⅓ of the height and ½ of the width of the bounding box) should be within the AOI to be defined as overlapping.

In prior art, detection of loitering events is typically done based on an individual object which spends a period of time within a AOI, wherein the definition of an "individual object" depends on the detection and tracking abilities of a device analyzing data of a captured scene. However, there may be problems with this approach. Often, detection of objects is based on movement of the objects. In case the object is standing still for a period of time, the tracking of this object typically is lost, and when the object starts moving again, this is considered as a new object. From a loitering perspective, the measurement of loitering time for this object will be erroneous, i.e. one measurement for the period before the object is standing still (and where the tracking was lost) and one measurement for the period when the object has started moving again, where the first and second measurements are not tied together. Consequently, detection of the loitering event for this object may be missed. Another case where inherent functionality of the tracking algorithm may cause missed loitering events is when the object is invisible (e.g. hiding behind a tree) for a period of time. In this case, the algorithm may result in two different detected objects, similar to the stand still case described above.

Moreover, only detecting loitering events based on individual objects may result in that some types of loitering behaviour is missed. For example, if a first person drops of stolen property in an AOI, which moments later is picked up by a second person, such behaviour may not result in a detected loitering event if the first or second person are not present within the AOI for enough time (this time period defines for how long any object is allowed to loiter within the AOI before the loitering event is triggered, herein referred to as a first threshold period of time) for the loitering event to be triggered.

The inventors have realized that by combining a loitering time (i.e. period of time during which an object is spending within an AOI) of objects with different object IDs which subsequent to each other spends time within the AOI, the above discussed missed loitering behaviors may be correctly detected. It should be noted that any overlapping period of time is not combined but only counted once. In other words, time periods 3-20 (for a first object), and 15-30 (for a second object) results in a loitering time period of 3-30 and an aggregated period of time with the value 27.

When the combined loitering time (herein referred to as aggregated period of time) exceeds a triggering time threshold (herein referred to as the first threshold of time), the loitering event is detected. The first threshold of time may be any suitable amount of time such as 20 seconds 40 seconds or a minute.

According to some embodiments, if a time difference between the third time stamp and the second time stamp exceeds a second threshold of time, the method further comprising the step of: before the step of adding a time difference between the fourth and third time stamp to the aggregate period of time, setting the aggregated period of time to zero. In this embodiment, it is defined a reset time margin (second threshold of time) which defines how long the AOI may be empty (no object data is received which has a position data within the AOI) before the aggregated period of time is reset (set to zero). The second threshold of time may be adjusted based on what types of behavior that should be detected as a loitering behavior. The second threshold of time may be 3 seconds, 6 seconds, 30 second or any other suitable amount of time.

According to some embodiments, the method further comprises measuring a time between each received object data having position data that overlaps with coordinates of the AOI, wherein the step of setting the aggregated period of time to zero is performed when the time exceeds the second threshold. In this embodiment, a clock is restarted every time an object data having position data that overlaps with coordinates of the AOI is received. As soon as the time reaches the second threshold, the aggregated period of time is set to zero. This may be advantageous since e.g. a graphical object (e.g. a progress bar) in a GUI showing the aggregated period of time may be zeroed as soon as the second threshold of time has passed, thus providing instant feedback of a loitering status to an operator. According to other embodiments, the aggregated period of time is not reset until a next loitering object data is received (more than the second threshold of time after the previous received loitering object data), i.e. just before adding a new time difference to the aggregated period of time.

According to some embodiments, when a loitering event has been detected, the method further comprises the step of continuing to detect loitering events until the time between two subsequently received object data having position data that overlaps with coordinates of the AOI exceeds the second threshold. In other words, the clock which is restarted every time an object data having position data that overlaps with coordinates of the AOI is received may be used for defining for how long a detection of a loitering event should be continued, after all objects have left the AOI. Consequently, when a loitering event has been detected, this detection will be continued for as long as any object data with a position within the AOI is received within the second period of time from the previously received object data with a position within the AOI. By continuing to detect loitering events according to this embodiment, the chances of an operator detecting the loitering behavior may be increased.

According to some embodiments, the method further comprises the steps of: receiving fifth object data corresponding to the detected second object within the monitored scene, the fifth object data comprising the second ID, a fifth position data and a fifth timestamp; determining that the fifth position data overlaps with coordinates of the AOI; and adding a time difference between the fifth and fourth time stamp to the aggregate period of time.

Consequently, the aggregated period of time will be increased as long as the second object is detected within the AOI, until the first threshold period of time is reached.

According to some embodiments, an exclude region (or exclude area) may be defined within the AOI. Objects residing in this area should not contribute to the aggregated period of time. This may for example be an area around a door within the AOI where people often exit to smoke. Such behavior may not be a loitering behavior which should be detected. The exclude region may be predefined or definable for e.g. an operator. In this embodiment, the method may further comprise the step of determining that the fourth position data further overlaps with coordinates of the exclude area, whereby the step of adding the time difference between the fourth and third time stamp to the aggregated period of time is not performed.

According to some embodiments, the method further comprises the steps of: receiving fifth object data corresponding to the detected second object within the monitored scene, the fifth object data comprising the second ID, a fifth position data and a fifth timestamp; determining that the fifth position data overlaps with coordinates of the AOI and not with the coordinates of the exclude area; and adding a time difference between the fifth and fourth time stamp to the aggregated period of time. Consequently, as soon as an object is moving outside of the exclude area, but still within the AOI, the time is again measured and contributes to the aggregated period of time.

According to some embodiments, filtering of received object data is performed before considering the object associated with the object data as a loitering candidate. As used herein, the term "loitering candidate" is generally understood to mean an object, positioned within the AOI (but optionally not within an exclude region), whose time period present within the AOI is measured and thus may contribute to the aggregated period of time.

The filtering may be any type of filtering. For example, according to some embodiments, received object data further comprises size data corresponding to a size of a detected object. In this case the method further comprises the step of comparing a size data of the third and fourth object data to a threshold size, wherein the step of adding a time difference between the fourth and third time stamp to the aggregate period of time is only performed if the respective size data exceeds the threshold size. The size data may be implicitly carried by the position data, e.g. in the case the position data defines a bounding box or polygon. The size data may also be a separate data field in the received object data. By this embodiment, objects such as animals (cats, dogs, rabbits), leaves or plastic bags blowing into the AOI may be filtered out and not result in a detected loitering event.

In other embodiments, received object data further comprises object type data corresponding to a type of a detected object. In this case, the method further comprises the step of comparing an object type data of the third and fourth object data to predefined object type, wherein the step of adding a time difference between the fourth and third time stamp to the aggregate period of time is only performed if the respective object type data equals the predefined object type. The object type data may be an integer, a enum, a text string or any other suitable data field. As an example, the object data may define that an object is of the type "car". The administrators of the loitering detection system may have set up the system to only detect loitering events for objects of type "human". By including object type data and perform filtering on such data, such scenarios may be possible.

According to a second aspect of the invention, the above object is achieved by a device adapted for detecting a loitering event, the device comprising a processor adapted for:

receiving first object data corresponding to a detected first object within a monitored scene, the first object data comprising a first ID, a first position data, and a first timestamp;

determining that the first position data overlaps with coordinates of the AOI;

receiving second object data corresponding to the detected first object within a monitored scene, the second object data comprising the first ID, a second position data, and a second timestamp;

determining that the second position data overlaps with coordinates of the AOI;

adding a time difference between the second and first time stamp to an aggregate period of time;

receiving third object data corresponding to a detected second object within the monitored scene, the third object data comprising a second ID different from the first ID, a third position data and a third timestamp;

determining that the third position data overlaps with coordinates of the AOI;

receiving fourth object data corresponding to the detected second object within the monitored scene, the fourth object data comprising the second ID, a fourth position data and a fourth timestamp;

determining that the fourth position data overlaps with coordinates of the AOI;

adding a time difference between the fourth and third time stamp to the aggregate period of time;

detecting a loitering event when the aggregated period of time exceeds a first threshold period of time.

According to a third aspect of the invention, the above object is achieved by a system comprising:

a first device for continuously capturing data of a scene, a second device adapted for receiving the captured data from the first device and to detect and track objects in the captured data, wherein the second device is further adapted for extracting object data corresponding to detected and tracked objects in the captured data and a corresponding time stamp of the extracted object data, each object data being associated with a detected and tracked object and comprising an ID of the associated object, a position data of the associated object, and the time stamp; and a third device according to the second aspect adapted for receiving the extracted object data from the second device.

According to some embodiments, the system further comprises a fourth device adapted for receiving a detected loitering event from the third device, and generate a visual and/or audible signal for making an operator aware of the loitering event.

According to some embodiments, the first device is one from the list of: a video capturing device, a RADAR device, an infrared sensor device, a microphone array, a thermal camera, and a time of flight camera.

Any of the first, second, third and fourth devices may be implemented in a single physical device. According to some embodiments, the first, second and third device is implemented in a video capturing device. Also, the fourth device may be implemented by the video capturing device.

According to a fourth aspect of the invention, the above object is achieved by a computer program product comprising a computer-readable storage medium with instructions adapted to carry out the method of the first aspect when executed by a device having processing capability.

The second, third and fourth aspects may generally have the same features and advantages as the first aspect. It is further noted that the invention relates to all possible combinations of features unless explicitly stated otherwise.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF EMBODIMENTS

The present invention will now be described more fully hereinafter with reference to the accompanying drawings, in which embodiments of the invention are shown. The systems and devices disclosed herein will be described during operation.

Basic loitering detection based on e.g. a video stream captured by a camera is known in the art. However, known loitering detection is performed on an individual object basis. An object is detected and tracked in the camera view and the time period that the object is located within the defined area of interest is compared to a predetermined time period specified for detection of a loitering event.

Figure 1:
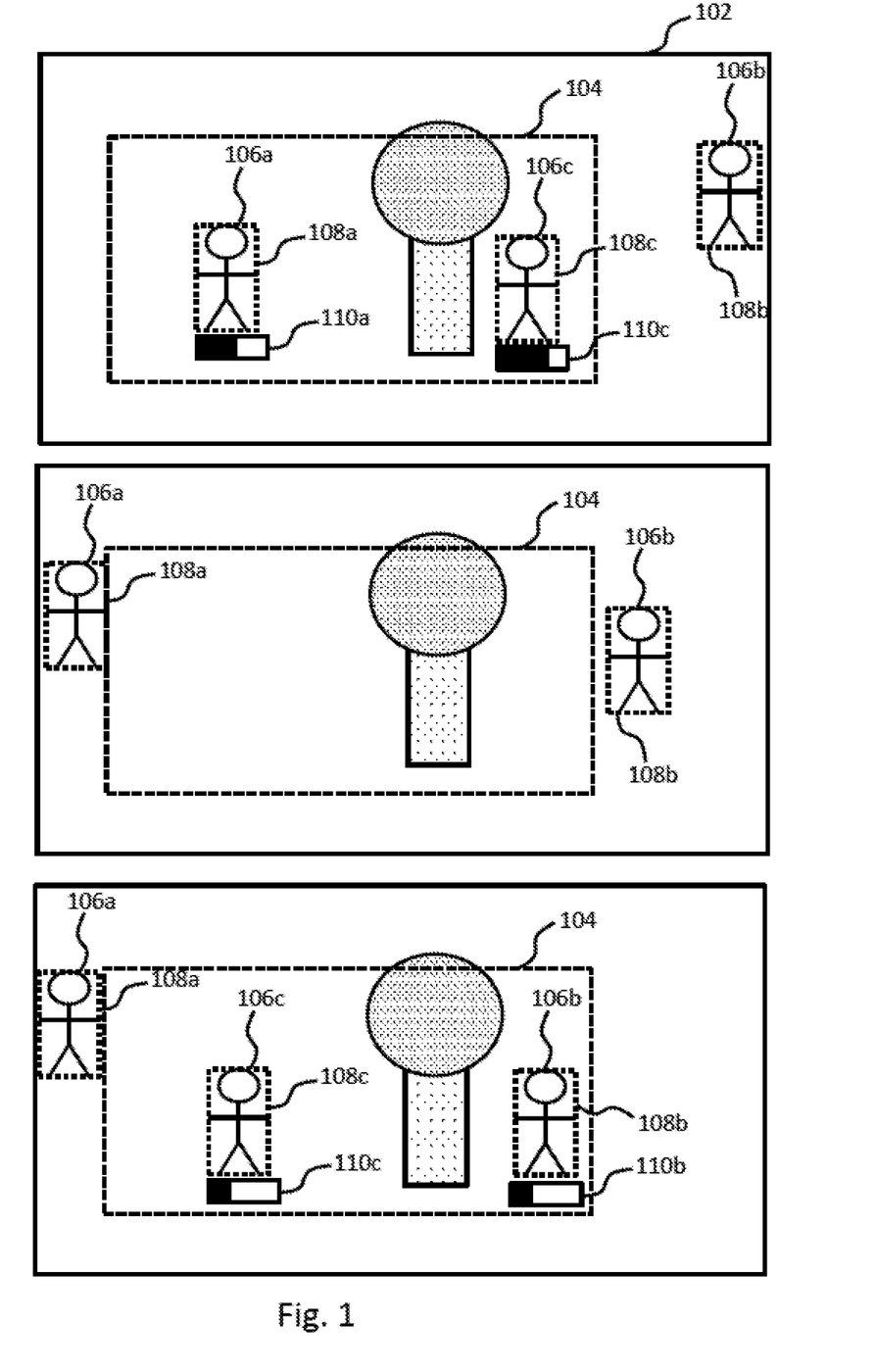
FIG. 1 shows loitering detection according to prior art.

FIG. 1 shows by way of example individual loitering detection during three snapshots of a scene 102 of interest, monitored by a camera. In the upper part, the scene at time $t_o$ is shown. In this snapshot, a first and a third object 106a, 106c is present within a predefined area of interest (AOI) 104, and a second object 106b is located outside the AOI 104. The objects 106a-c are defined by bounding boxes 108a-c which defines their position in relation to the scene 102 and AOI 104. To detect a loitering event, a time period that an object 106a-c is located within the AOI 104 is measured. For this reason, beneath each object 106a, 106c in the AOI 104 is a progress bar 110a, 110c, shown, which represent the time period during which each object 106a, 106c has been present in the AOI 104. As visible by the progress bars 110a, 110c, the individually measured time periods that the objects 106a, 106c have been located in the AOI 104 are approaching the predetermined time period specified for the loitering event.

In the second snapshot (middle part of FIG. 1), the scene 102 at time $t_1>t_0$ is shown. In this snapshot, the first object 106a has moved outside the AOI 104. Consequently, the time for this object 106a is no longer measured, and the loitering within the AOI of the first object 106a did not cause detection of a loitering event. The third object 106c is hidden by a stationary object (e.g. a tree) in the scene 102. Consequently, the object detection and tracking algorithm analysing images from the camera capturing the scene will no longer be able to track object 106c. The second object 106b is still outside the AOI 104. During this snapshot, no time is measured, since no object is detected within the AOI 104.

In the last snapshot, the scene 102 at time $t_2>t_1$ is shown. In this snapshot, the third object 106c is again visible in the scene 102 and is positioned in the AOI 104. However, for the detection and tracking algorithm, which analyze images of the scene, the third object is a new object to the scene (since tracking was lost at time $t_1$, or between time $t_0$ to $t_2$). As mentioned above, beneath each object 106b, 106c in the AOI 104 is a progress bar 110b, 110c, shown, which represent a time period during which each object 106b, 106c has been present in the AOI 104. As can be seen, the measured time period is less in the third snapshot compared to the first snapshot.

As described above, several problems exist with this strategy of measuring a loitering time period. In many occasions, combining the loitering time of objects with different object IDs which subsequent to each other spends time within the AOI would be beneficial, i.e. a group loitering strategy or a non-specific object loitering strategy. Such loitering detection strategy will now be described using FIGS. 2-6.

Figure 5:
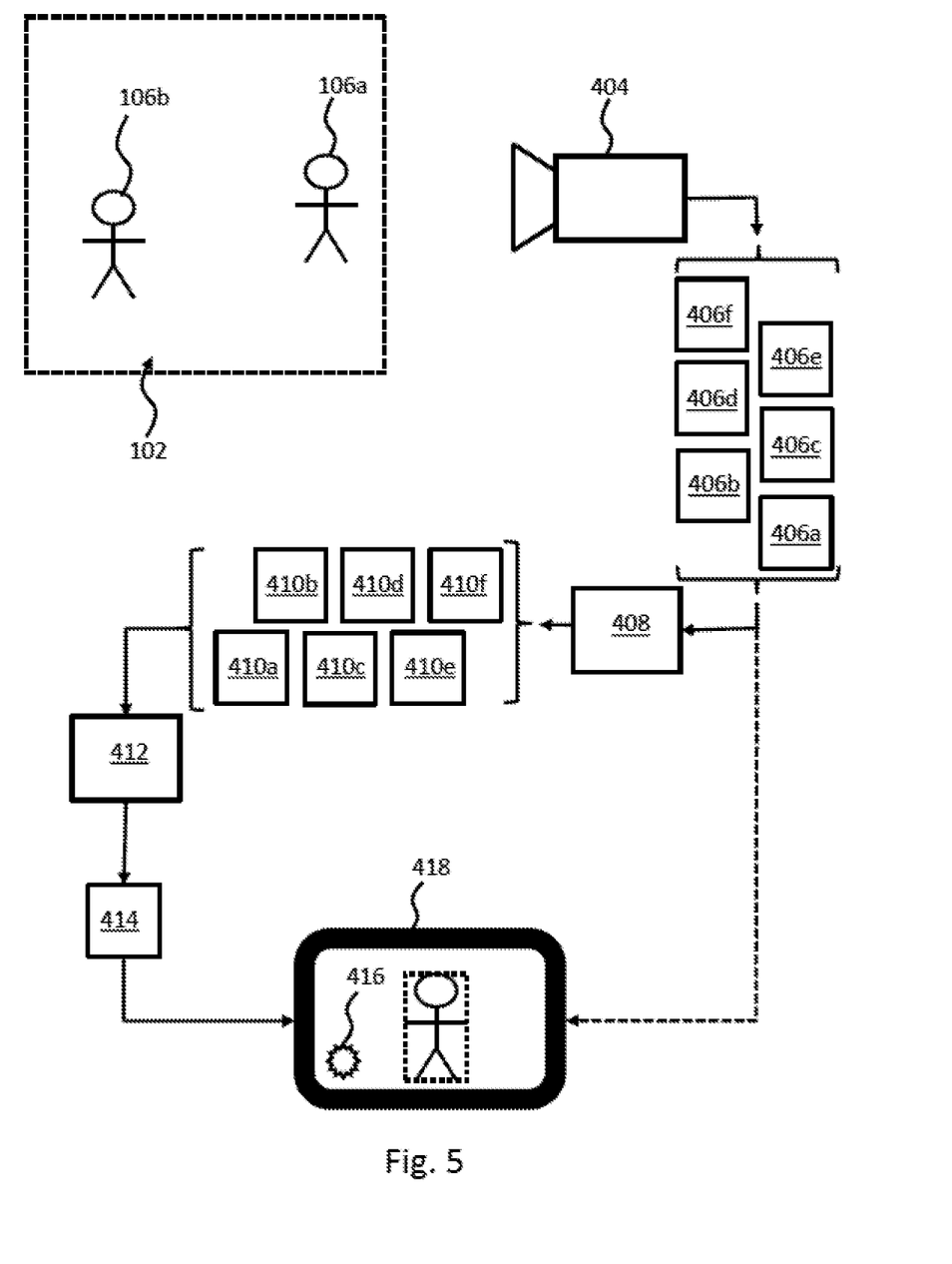
FIG. 5 shows a system for detecting loitering events, according to some embodiments.

FIG. 5 shows by way of example a system for loitering detection. In this example, a first device 404 (e.g. a camera) is continuously capturing data 406 of a scene 102. The first device 404 may be any suitable device for capturing data which can be used for individual detection and tracking of an object in the scene 102, such as a video capturing device, a RADAR device, an infrared sensor device, a microphone array, a thermal camera, or a time of flight camera.

The captured data 406 (which format depends on the first device 404) is then transmitted to a second device 408 which is adapted for receiving the captured data 406 from the first device 404 and to detect and track objects 106a, 106b in the captured data. The second device 408 may be implemented in the first device 404, or may be implemented in a device separate from the first device 404. The second device 408 is adapted for extracting object data 410 corresponding to detected and tracked objects 106a, 106b in the captured data 406 and a corresponding time stamp of the extracted object data 410. Each object data 410 is associated with a detected and tracked object 106a, 106b and comprising an ID of the associated object 106a, 106b, a position data of the associated object 106a, 106b, and the time stamp. The second device thus implement a suitable analysis algorithm based on what type of captured data 406 (e.g. image data, video data, audio data, RADAR data etc.) that is received from the first device 404.

According to some embodiments, the outputted object data 410 is grouped in object data frames corresponding to the image frames in which the objects were detected, and the object data is hence time-stamped, similar to the captured image frames (or detection samples, snapshot, audio data frame etc., depending on the device 404 capturing data of the scene). In other words, in this embodiment, if two or more objects are detected at one point in time of the scene 102 captured by the first device 404, the corresponding extracted object data is grouped into one data set which is transmitted to a loitering detection device (third device) 412. Except object ID, position data and a time stamp, such grouped object data may comprise other information such as:
- Objects that have previously been seen but now has disappeared.
- Objects that have been part of a merge (two or more object merges into one object).
- Objects that have been part of a split (one object splits into two or more objects).

In other embodiments, each object detected at a point in time of the scene 102 results in a separate transmission of object data 410.

Further information of the detected and tracked object may be included in the extracted object data 410, such as size data, object type data, color data, etc.

The extraction of object data 410 in the second device 408 may be done in a sampling rate (e.g. FPS, frames per second) different from the sampling rate of the captured data 406 received from the first device 404. In other words, not all captured data 406 may be analyzed by the second device 408. In other embodiments, the FPS of data 406, 410 outputted by the first 404 and second device 408 may be equal, meaning that all captured data 406 is analyzed by the second device 408.

The extracted object data 410 is then continuously transmitted to the third device 412 which is adapted to detect loitering events 414 (described further below) from the received object data 410. The third device 412 may be implemented in the first device 404, and/or in the second device 408 or may be implemented in a device separate from the first device 404. According to some embodiments, the first 404, second 408, and third 412 devices are implemented in a video recording device. As an alternative the third device 412 may be located on an external server connected to the first/second device 404, 408 over a network or similar. Both the second device 408 and the third device 412 may of course also be located at a server (for example a video management server, VMS). An advantage of the system and methods as described herein is hence that the flexibility of implementation may be substantial. The third device 412 comprises one or more processors adapted to carry out the methods for detection of loitering events described herein. For example, the third device 412 may run a computer program product comprising a computer-readable storage medium with instructions adapted to carry out the method when executed by the device 412 having processing capability.

In some embodiments, the detected loitering events 414 are transmitted to a fourth device (for example a display 418) which is adapted for receiving the detected loitering event 414 from the third device 412, and generate a visual and/or audible signal 416 for making an operator aware of the loitering event. The fourth device may at the same time display the captured data 406, or parts of the captured data 406 such as data within the AOI. The fourth device may further display description data, e.g. extracted from the object data 410, such as bounding boxes or polygons of the objects in the scene, the ID of the objects etc.

In some embodiment, a detected loitering event may trigger actions such as sending a message (email, SMS), making a call, or otherwise alert someone of the detected loitering event. The detected loitering event may further trigger actions such as recording data of the monitored scene in a higher resolution, recording data of the loitering object (s) in a higher resolution or in a separate data stream, storing an image of the loitering object(s) in a database, etc.

Figure 6:
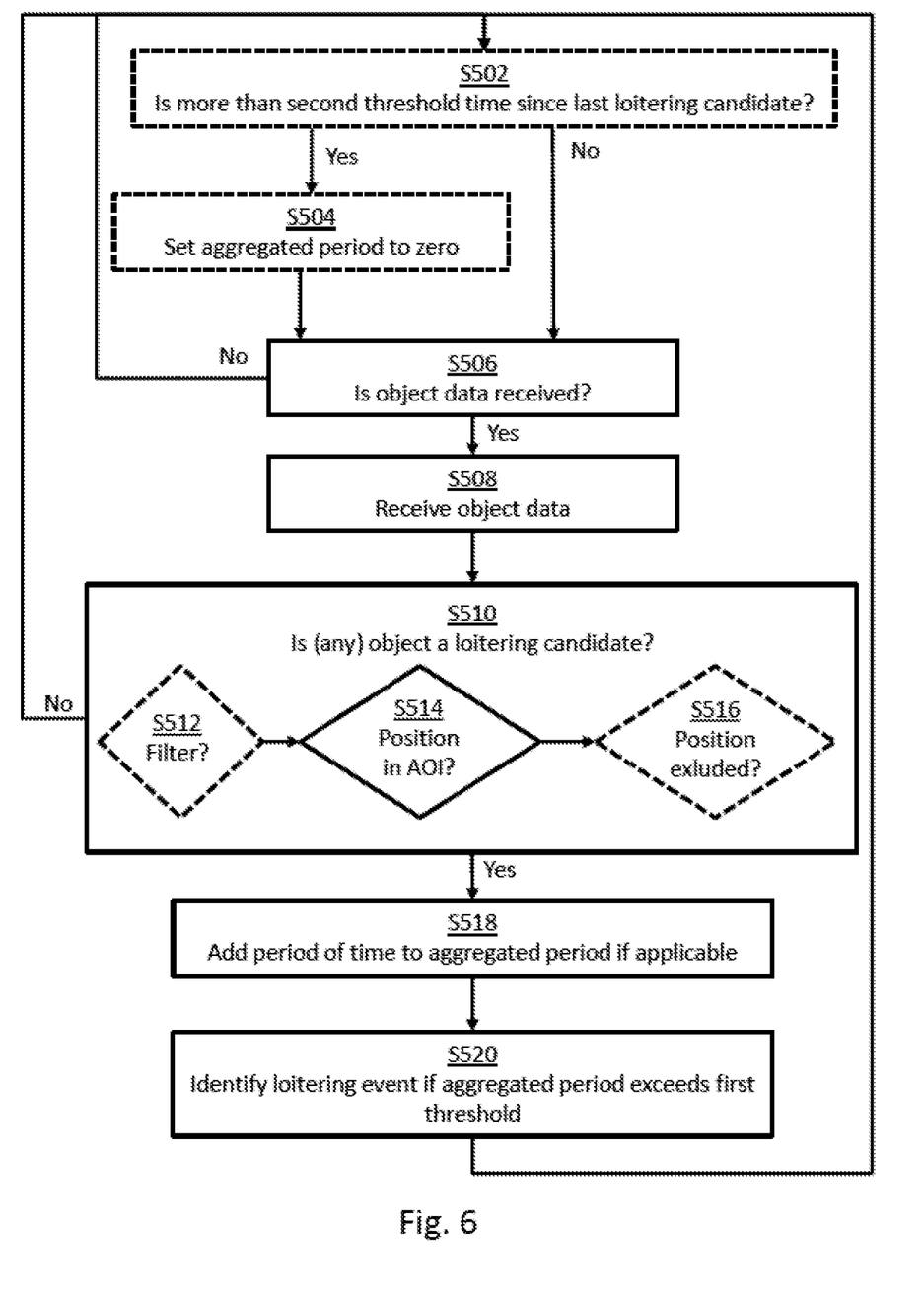
FIG. 6 shows a flow chart of a method for detecting loitering events, according to some embodiments.

Functionality of the third device 412 will now be described using FIGS. 2-4 in conjunction with the system for loitering detection of FIG. 5 and the flow diagram of FIG. 6. In the below, and by way of example, three scenarios will be described, which all maps to the number of captured data 406, extracted object data 410, and detected loitering event 414 of FIG. 5. It should be noted however that content of e.g. extracted object data having the same reference number between two scenarios may differ.

Figure 2:
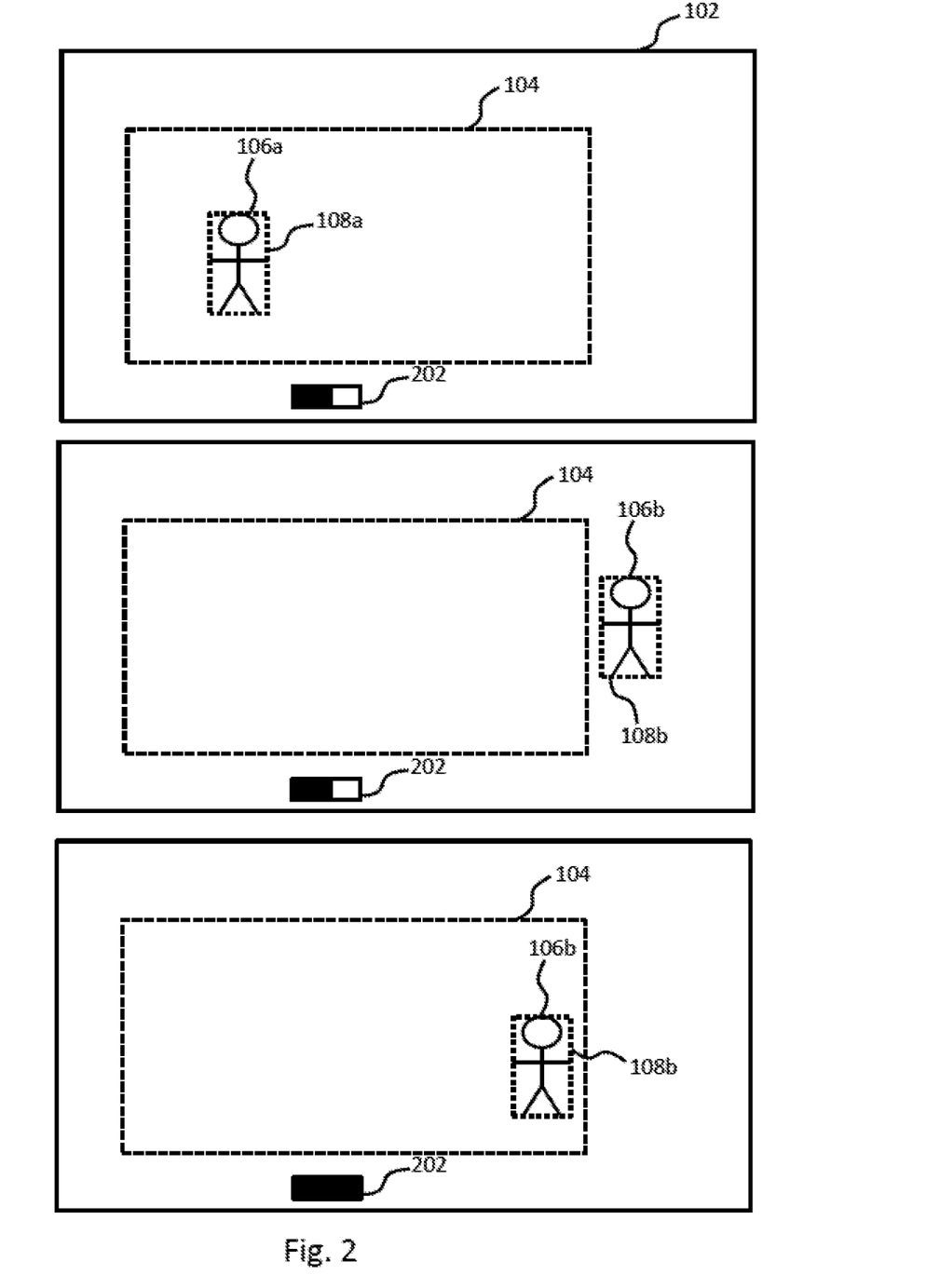
FIG. 2 shows a method for detecting a loitering event within an area of interest according to embodiments.
Figure 3:
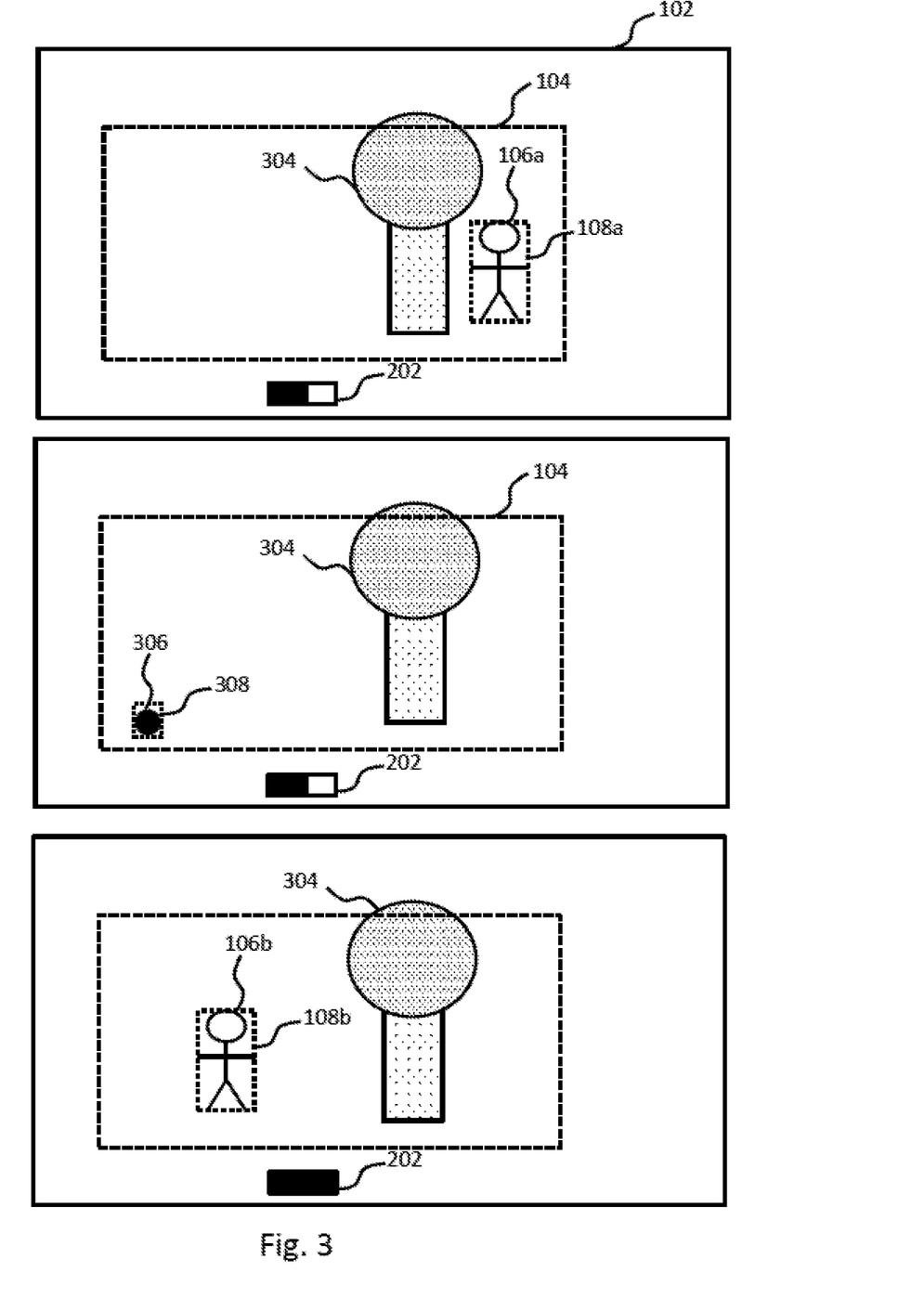
FIG. 3 shows a method for detecting a loitering event within an area of interest, which includes a stationary object, according to embodiments.
Figure 4:
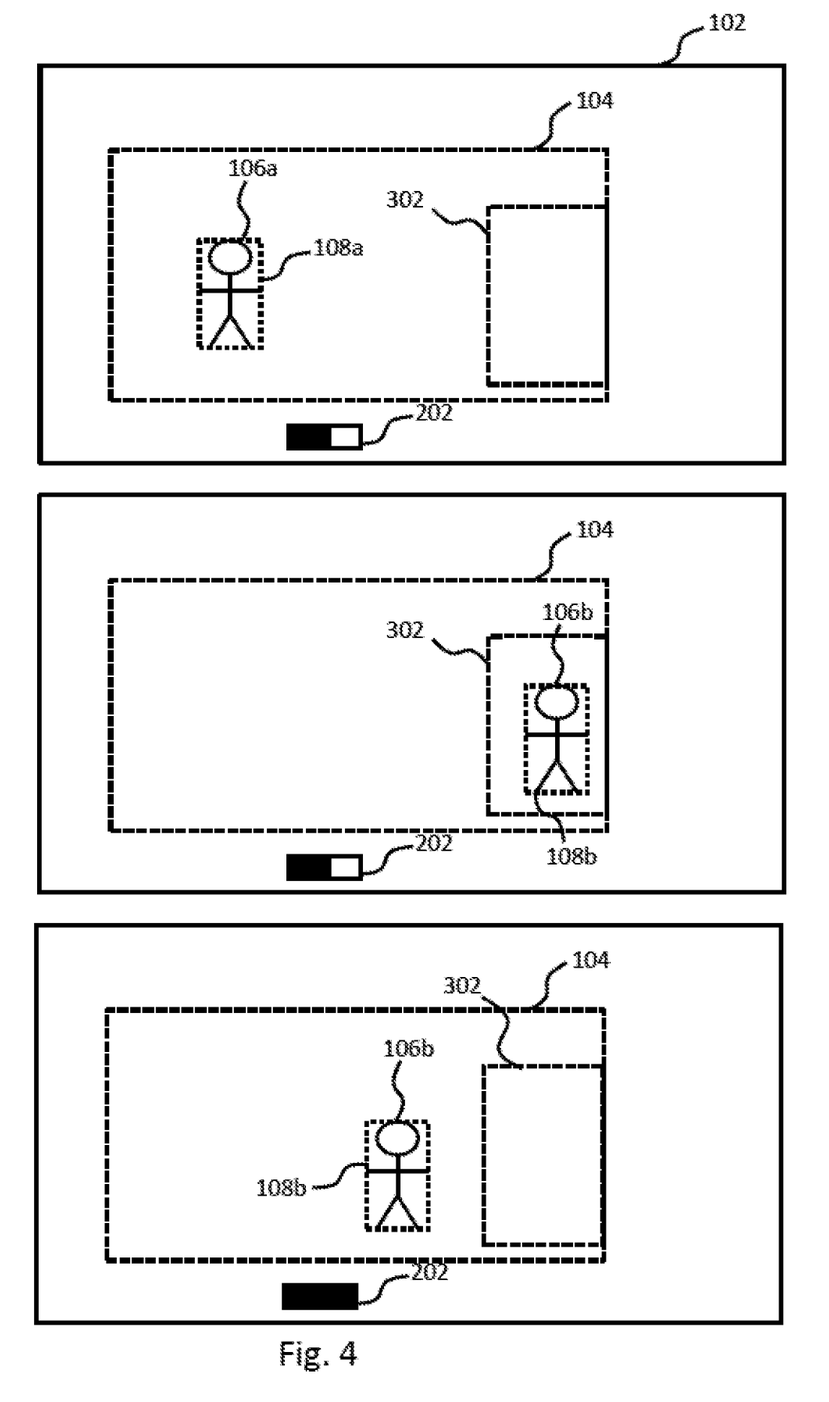
FIG. 4 shows a method for detecting a loitering event within an area of interest, which includes an exclude area, according to embodiments.

It should further be noted that in the examples of FIGS. 2-4, for ease of description, only one object 106 is present in the AOI 104 during each period of time. However, it should be noted that a plurality of objects 106 may be present in the AOI 104 during a period of time. In these cases, only one period of time will be added to an aggregated period of time, as described above and as understood by the skilled person.

FIG. 2 shows by way of example group loitering detection during periods of time ($t_0$ to $t_1$, $t_2$ to $t_3$, and $t_4$ to $t_5$, where $t_0 < t_1 < t_2 < t_3 < t_4 < t_5$) of a scene 102 of interest. The scene 102 comprises an AOI 104.

To explain the method for loitering detection, let's assume that for each period of time, two captured data 406 (e.g. one at $t_0$ and one at $t_1$ for the first period of time) from the first device 404 is analysed by the second device 408. The similar assumption is made for FIGS. 3-4 below.

For the first period of time (upper part of FIG. 2), the second device receives two captured data 406a, 406b from the first device 404 which is analysed for objects. During this period of time, a first object 106a is present in the scene 102. No other objects exist in the scene during this time period. For the first captured data (at time $t_0$), the second device 408 extracts a first object data 410a corresponding to a detected first object 106a within the monitored scene 102, the first object data comprising at least a first ID, a first position data, and a first timestamp $t_0$. For the second captured data (at time $t_1$), the second device 408 extracts a second object data 410b corresponding to the detected first object 106a within the monitored scene 102, the first object data comprising at least the first ID, a second position data, and a second timestamp $t_1$. This means that a third device (loitering detection device) 412, which is arranged to detect loitering events, has received S508 first object data 410a and second object data 410b.

For the first object data 410a, the third device 412 first determines S510 if the object of the first object data is a loitering candidate. This is done at least by determining S514 if the first position data overlaps with the AOI 104. In the example of FIG. 2, the position data is the bounding box of the first object 106a (referred to as 108a in the figure), and the AOI 104 is defined to cover only parts of the monitored scene 102. It is determined that the first position data overlaps with coordinates of the AOI 104. As described above, in case the AOI 104 covers the entire monitored scene 102, all received objects may be determined to have positions overlapping with the AOI. However, in the examples of FIGS. 2-4, the AOI 104 is defined to cover only parts of the monitored scene 102. In these embodiments, a position data of a received object data may describe that the associated object is positioned outside the AOI 104, or overlapping with the AOI 104. Consequently, the step of determining if a position data overlaps with the AOI 104 is performed using the position data and coordinates of the AOI.

Now returning to FIG. 2, since, in this example, no other object data for this object 106a has been received earlier by the third device, no period of time is to be added to the aggregated period of time. If the aggregated period of time is defined as a loitering detection clock, the clock is now started.

For the second object data 410b, the third device 412 first determines S510 if the object of the second object data 410b is a loitering candidate as described above for the first object data 410a. It is determined S514 that the second position data overlaps with coordinates of the AOI 104.

Optionally, between each received object data 410, the third device 412 continuously measures a time between each received object data determined S510 to be a loitering candidate data, checks S502 if the time exceeds a second threshold. If this is the case, the aggregated period of time is set to zero. The second threshold of time determines if the loitering detection clock should be reset, because a period of time between two loitering candidates has exceeded the second threshold of time. The checking S502 may be performed when no object data is received S506, when an object is determined to not be a loitering candidate S510, and after each loitering candidate has been processed as described herein. In other embodiments, the steps referred to as S502 and S504 in FIG. 6 would continuously be performed in a separate process by the third device 412. In any event, the check is performed before the step of adding S518 a period of time to the aggregated period of time. Moreover, it should be noted, as described above, that according to some embodiments, the received S508 object data may comprise a plurality of object data, in other words, in this embodiment, if two or more objects are detected at one point in time of the scene captured by the first device, the corresponding extracted object data is grouped into one data set which is transmitted to the loitering detection device (third device) 412. In this case, each object data in the received data set is processes according to what is described herein.

In this case, the period of time $t_1$-$t_0$ does not exceed the second threshold of time. Instead, the period of time $t_1$-$t_0$ is added S516 to the aggregated period of time, represented by the progress bar 202 in FIG. 2. The aggregated period of time 202 does not yet exceed a first threshold period of time (represented in FIG. 2 by a full progress bar), so no loitering event will be detected.

During the second period of time ($t_2$ to $t_3$, shown in the middle part of FIG. 2), the second device receives two captured data 406c, 406d from the first device 404 which is analysed for objects. During this period of time, a second object 106b is present in the scene 102. No other objects exist in the scene during this time period. As explained above, this means that the third device 412 receives S508 third object data 410c and fourth object data 410d. However, for both these object data 410c, 410d, it is determined S510 that none of them represent a loitering object, since it is determined S514 that the respective position data does not overlap with coordinates of the AOI 104. During this period of time, no period of time is added to the aggregated period of time 202. So, in the analogy of using a clock, the clock is paused.

During the second period of time ($t_4$ to $t_5$, shown in the lower part of FIG. 2), the second device receives two captured data 406e, 406df from the first device 404 which is analysed for objects. During this period of time, the second object 106b is present in the scene 102. No other objects exist in the scene during this time period. As explained above, this means that the third device 412 receives S508 fifth object data 410e and sixth object data 410f.

For the fifth object data 410e, the third device 412 first determines S510 if the object of the fifth object data 410e is a loitering candidate as described above for the first object data 410a. It is determined that the fifth position data overlaps S514 with coordinates of the AOI 104.

As described above, the third device may continuously measure a time between each received object data having position data that overlaps with coordinates of the AOI, and set S504 the aggregated period of time to zero when it is determined S502 that the measured time exceeds the second threshold. In other words, if it is determined that a time difference between the fifth time stamp $t_4$ and the second time stamp $t_1$ (which was the time when the last loitering candidate was determined to exist) exceeds the second threshold of time, the aggregated period of time is set to zero.

However, in this example, the aggregated time period 202 is not set S504 to zero. No period of time will be added S518 to the aggregated period of time 202, since the third device 412 has not previously received object associated with the second object 106c and which was determined to represent a loitering object. Using the analogy of the loitering detection clock, the clock is now started again.

For the sixth object data 410f, the third device 412 determines S510 if the object of the sixth object data 410f is a loitering candidate as described above for the first object data 410a. It is determined S514 that the sixth position data overlaps with coordinates of the AOI 104.

The period of time $t_5$-$t_4$ (i.e. the time difference between the sixth and fifth time stamp) is thus added S518 to the aggregated period of time, represented by the progress bar 202 in FIG. 2. While the second object 106b stays within the AOI (or if a new loitering candidate enters the scene 102) the aggregated period of time 202 will continue to increase in the same way as disclosed above, until a loitering event 414 is detected.

In FIG. 2, the aggregated period of time 202 does now exceed the first threshold period of time (represented in FIG. 2 by a full progress bar 202), so the loitering event 414 is detected.

In this way, loitering of different objects (e.g. persons) subsequent to each other may cause a loitering event to be detected. This may be beneficial from a security perspective, since groups of people loitering in an AOI often indicate suspicious behavior, even in the case where a single object is not staying in the AOI for enough amount of time for a loitering event to be detected based only on the loitering time of this single object.

According to some embodiments, the loitering event may continue to be detected for at least the second threshold of time after the first detection. In some embodiments, the loitering event may continue to be detected until all loitering candidates have disappeared. In other words, if new objects, which is determined S510 to be loitering candidates, enters the scene 102, the loitering event will continue to be detected for as long as the scene 102 comprises loitering candidates (and optionally for an additional second threshold of time after all loitering candidates have disappeared). Similarly, this may also be the case for as long as the second object 106b is staying in the scene and determined S510 to be a loitering candidate.

As soon as the loitering event is not detected anymore, the aggregated period of time will be set to zero.

FIG. 3 shows another scenario where individual loitering detection may not be sufficient to detect suspicious behavior. In this case, the AOI 202 comprise a stationary object 304 (e.g. a tree, a car, or any other object which can hide a loitering candidate). Often, the algorithms for object detection and tracking may not be able to track objects which disappears from the scene for a while. When the object reappears, the algorithm may interpret this as a new object, e.g. with a new object ID. From a loitering perspective, this may cause a missed loitering event, as also explained above. The method for loitering detection described herein may solve this problem, and correctly detect a loitering event also in this scenario, as will be explained below.

FIG. 3 shows by way of example group loitering detection during periods of time ($t_0$ to $t_1$, $t_2$ to $t_3$, $t_4$ to $t_5$, where $t_0 < t_1 < t_2 < t_3 < t_4 < t_5$) of a scene 102 of interest. The scene 102 comprises an AOI 104.

Similar to the case of FIG. 2, the first period of time (shown in the upper part of FIG. 3) will result in an aggregated period of time 202 of $t_1$-$t_0$.

For the second period of time (middle part of FIG. 3), the aggregated period of time 202 will be stayed, since the object (referred to as 106a in upper part of FIG. 3) within the AOI is hidden by the stationary object 304. Another object 306 is part of the captured data 406c, 406d, but the corresponding object data 410c, 410d will not result in loitering candidates, since, in this scenario, further filtering S512 (except position data outside the AOI 104) is done when determining S510 if an object is a loitering candidate or not. In this case, the object data 410c, 410d comprises size data corresponding to a size of the detected object 306. In this case, the size data may be extracted from the bounding box 308 of the detected object which is determined by the second device 408. In this embodiment, the size data of the third 410c and fourth object data 410d is compared S512 to a threshold size. Since it is determined that the size of the detected object is to small, the step of adding S518 a time difference between the fourth ($t_3$) and third ($t_2$) time stamp to the aggregate period of time is not performed. Other types of filtering may be performed, such as filtering on object type data (car, human, animal) or other type of describing data of the object associated with the object data, such as color, shape, speed, velocity, etc.

For the third period of time ($t_4$ to $t_5$, lower part of FIG. 3), the previously hidden object is again visible, and still within the AOI 104. However, as explained above, the object data 410e, 410f, extracted by the second device 408 will have a different object ID compared to the object data 410a, 410b extracted by the second device 408 for the first period of time ($t_0$ to $t_1$, upper part of FIG. 3). Consequently, in FIG. 3, the object in the lower part of FIG. 3 is referred to with a different reference (106b) compared to the object in the upper part of FIG. 3, since from a loitering perspective, the objects are different (having different IDs). However, the fact that the detected object has different IDs during different periods of time may not influence the detection of the loitering event. So, for the third period of time, as explained in conjunction with FIG. 2 above, the time difference between the sixth ($t_5$) and fifth ($t_4$) time stamp will be added S518 to the aggregate period of time 202, leading to a detected S520 loitering event 414.

A further concept within loitering detection as defined herein is an exclude area. This is an area within the AOI 104 in which time spent by an object should not be counted as loitering. This concept is shown in FIG. 4.

In FIG. 4, similar to the case of FIGS. 2-3, the first period of time (shown in the upper part of FIG. 4) will result in an aggregated period of time 202 of $t_1$-$t_0$.

During the second period of time ($t_2$ to $t_3$, shown in the middle part of FIG. 4), the second device receives two captured data 406c, 406d from the first device 404 which is analysed for objects. During this period of time, a second object 106b is present in the scene 102. No other objects exist in the scene during this time period. As explained above, this means that the third device 412 receives S508 third object data 410c and fourth object data 410d. However, for both these object data 410c, 410d, it is determined S510 that none of them represent a loitering object, since it is determined S516 that the respective position data does overlap with coordinates of the exclude region 302. During this period of time, no period of time is added to the aggregated period of time 202. So, in the analogy using a clock, the clock is paused.

However, as soon as the second object is positioned outside the exclude region 302, but still inside the AOI 104, time is again added S518 to the aggregated period of time 202, as disclosed above, and shown in the lower part of FIG. 4. According to some embodiments, the period between the last object data 410d with position data in the exclude region 302 and the subsequent object data 410e (where the second object 106b is positioned outside the exclude region 302, but still inside the AOI 104) is added to the aggregated period of time, meaning that a time difference ($t_4$-$t_3$) between the fifth 410e and fourth 410d time stamp will be added to the aggregated period of time. In this embodiment, the time difference ($t_5$-$t_4$) between the sixth 410e and fifth 410d time stamp will of course also be added to the aggregated period of time 202 similarly to what is described above.

According to other embodiments the aggregated period of time is, in this scenario, not increased until at the sixth time stamp ($t_5$), meaning that a time difference ($t_5$-$t_4$) between the sixth 410f and fifth 410e time stamp will be added S518 to the aggregated period of time 202 while the time difference ($t_4$-$t_3$) between the fifth 410e and fourth 410d time stamp will not be added.

In the above the inventive concept has mainly been described with reference to a limited number of examples. However, as is readily appreciated by a person skilled in the art, other examples than the ones disclosed above are equally possible within the scope of the inventive concept, as defined by the appended claims. For example, the method for detecting a loitering event may be defined differently, but still be within the scope of the appended claims. According to one embodiment, the method for detecting loitering event within an AOI may comprise the steps of:

Receiving object data corresponding to at least one detected object within a monitored scene, the object data comprises at least one position data, each position data being associated with a detected object of the at least one detected object, and a timestamp associated with the position data, Determining points in time where at least one object is detected within the AOI based on the received object data, For each determined point in time, calculating the difference in time to the closest previously determined point in time, Comparing each calculated difference in time with a second threshold time, and upon determining that a calculated difference in time is less than a second threshold time, adding the calculated difference in time to an aggregated period of time, Detecting a loitering event when the aggregated period of time exceeds a first threshold period of time.

According to some embodiments, wherein if a calculated time difference exceeds the second threshold of time, the method further comprises setting the aggregated period of time to zero.

According to some embodiments, the object data further comprises a ID of the associated detected object, wherein each determined point in time is associated with at least one ID, wherein at least two of the determined points in time is associated with different at least one ID. In some embodiments, the at least one ID associated with a first determined point in time is mutually exclusive from the at least one ID associated with a second determined point in time, the second determined point in time being subsequent to the first point in time.

Any other embodiment defined herein may be reformulated to fit with this differently defined method.

The invention claimed is:

1. A method for detecting a loitering event within an area of interest, AOI, the method comprising the steps of:
    receiving first object data corresponding to a detected first object within a monitored scene, the first object data comprising a first ID, first position data, and a first timestamp;
    determining that the first position data overlaps with the AOI;
    receiving second object data corresponding to the detected first object within a monitored scene, the second object data comprising the first ID, second position data, and a second timestamp; determining that the second position data overlaps with the AOI;
    adding a time difference between the second and first time stamp to an aggregate period of time;
    receiving third object data corresponding to a detected second object within the monitored scene, the third object data comprising a second ID different from the first ID, third position data and a third timestamp, wherein the third timestamp is later than the second time stamp; determining that the third position data overlaps with the AOI;
    receiving fourth object data corresponding to the detected second object within the monitored scene, the fourth object data comprising the second ID, fourth position data and a fourth timestamp;
    determining that the fourth position data overlaps with the AOI;
    adding a time difference between the fourth and third time stamp to the aggregate period of time;
    detecting a loitering event when the aggregated period of time exceeds a first threshold period of time.

2. The method according to claim 1, wherein if a time difference between the third time stamp and the second time stamp exceeds a second threshold of time, the method further comprising the step of:
    before the step of adding a time difference between the fourth and third time stamp to the aggregated period of time, setting the aggregated period of time to zero.

3. The method according to claim 2, further comprising the step of:
    measuring a time between each received object data having position data that overlaps with the AOI, wherein the step of setting the aggregated period of time to zero is performed when the time exceeds the second threshold.

4. The method according to claim 3, further comprising the step of:
    when a loitering event has been detected, continue to detect loitering events until the time between two subsequently received object data having position data that overlaps with the AOI exceeds the second threshold.

5. The method according to claim 1, further comprising the steps of:
    receiving fifth object data corresponding to the detected second object within the monitored scene, the fifth object data comprising the second ID, a fifth position data and fifth timestamp;
    determining that the fifth position data overlaps with the AOI; and
    adding a time difference between the fifth and fourth time stamp to the aggregate period of time.

6. The method according to claim 1, further comprising the step of:
    determining that the fourth position data further overlaps with an exclude area, whereby the step of adding the time difference between the fourth and third time stamp to the aggregated period of time is not performed.

7. The method according to claim 6, further comprising the steps of:
    receiving fifth object data corresponding to the detected second object within the monitored scene, the fifth object data comprising the second ID, fifth position data and a fifth timestamp;
    determining that the fifth position data overlaps with the AOI and not with the exclude area; and
    adding a time difference between the fifth and fourth time stamp to the aggregate period of time.

8. The method according to claim 1, wherein received object data further comprises size data corresponding to a size of a detected object, wherein the method further comprising the step of: comparing size data of the third and fourth object data to a threshold size, wherein the step of adding a time difference between the fourth and third time stamp to the aggregate period of time is only performed if the respective size data exceeds the threshold size.

9. The method according to claim 1, wherein received object data further comprises object type data corresponding to a type of a detected object, wherein the method further comprising the step of:
    comparing object type data of the third and fourth object data to predefined object type, wherein the step of adding a time difference between the fourth and third time stamp to the aggregate period of time is only performed if the respective object type data equals the predefined object type.

10. A device adapted for detecting a loitering event, the device comprising a processor adapted for:
    receiving first object data corresponding to a detected first object within a monitored scene, the first object data comprising a first ID, first position data, and a first timestamp;
    determining that the first position data overlaps with the AOI;
    receiving second object data corresponding to the detected first object within a monitored scene, the second object data comprising the first ID, second position data, and a second timestamp; determining that the second position data overlaps with the AOI;
    adding a time difference between the second and first time stamp to an aggregate period of time;
    receiving third object data corresponding to a detected second object within the monitored scene, the third object data comprising a second ID different from the first ID, third position data and a third timestamp, wherein the third timestamp is later than the second time stamp; determining that the third position data overlaps with the AOI;
    receiving fourth object data corresponding to the detected second object within the monitored scene, the fourth object data comprising the second ID, fourth position data and a fourth timestamp;

determining that the fourth position data overlaps with the AOI;

adding a time difference between the fourth and third time stamp to the aggregate period of time;

detecting a loitering event when the aggregated period of time exceeds a first threshold period of time.

11. A system comprising:

a first device for continuously capturing data of a scene, a second device adapted for receiving the captured data from the first device and to detect and track objects in the captured data, wherein the second device is further adapted for extracting object data corresponding to detected and tracked objects in the captured data and a corresponding time stamp of the extracted object data, each object data associated with a detected and tracked object and comprising an ID of the associated object, position data of the associated object, and the time stamp; and a third device according to claim 10 adapted for receiving the extracted object data from the second device.

12. The system according to claim 11, further comprising a fourth device adapted for receiving a detected loitering event from the third device, and generate a visual and/or audible signal for making an operator aware of the loitering event.

13. The system according to claim 11, wherein the first device is one from the list of:

a video capturing device, a RADAR device, an infrared sensor device, a microphone array, a thermal camera, and a time of flight camera.

14. The system according to claim 11, wherein the first, second and third device is implemented in a video capturing device.

15. A computer program product comprising a non-transitory computer-readable storage medium with instructions adapted to carry out the method of claim 1, when executed by a device having processing capability.

* * * * *